United States Patent [19]
Schneider

[11] Patent Number: 5,218,659
[45] Date of Patent: Jun. 8, 1993

[54] OPTICAL COMMUNICATIONS CABLE
[75] Inventor: Reiner Schneider, Ebersdorf, Fed. Rep. of Germany
[73] Assignee: Siemens Aktiengesellschaft, Munich, Fed. Rep. of Germany
[21] Appl. No.: 778,182
[22] PCT Filed: May 30, 1990
[86] PCT No.: PCT/DE90/00419
   § 371 Date: Feb. 3, 1992
   § 102(e) Date: Feb. 3, 1992
[87] PCT Pub. No.: WO91/01014
   PCT Pub. Date: Jan. 24, 1991
[30] Foreign Application Priority Data
   Jul. 6, 1989 [DE] Fed. Rep. of Germany ....... 3922475
[51] Int. Cl.⁵ .............................................. G02B 6/44
[52] U.S. Cl. ..................................... 385/110; 385/113
[58] Field of Search ................................ 385/109–113
[56] References Cited
   U.S. PATENT DOCUMENTS
   4,038,489 7/1977 Stetson et al. ................... 385/109 X
   4,786,138 11/1988 Buckley ............................. 385/110
   4,793,686 12/1988 Saito ................................... 385/110
   5,087,110 2/1992 Inagaki et al. ..................... 385/110

FOREIGN PATENT DOCUMENTS
   0020036 12/1980 European Pat. Off. .
   0169647 1/1986 European Pat. Off. .
   0216548 4/1987 European Pat. Off. .
   2523738 12/1975 Fed. Rep. of Germany .
   2275785 1/1976 France .
   2562272 10/1985 France .

Primary Examiner—Akm E. Ullah
Attorney, Agent, or Firm—Hill, Steadman & Simpson

[57] ABSTRACT

An optical communications cable includes a core of tensile material about which is provided an extruded plastic chambered body, the chambers accommodating optical fibers. The outer wall of each chamber is provided with grooves along which the outer wall may be torn or cut to peel the wall back like a banana peel for access to the chamber. Alternate embodiments include shell or cap like portions forming the chamber outer wall and connected to the chambered body by thin tearable webs so that the shell or cap like portions may be peeled back.

6 Claims, 1 Drawing Sheet

U.S. Patent June 8, 1993 5,218,659
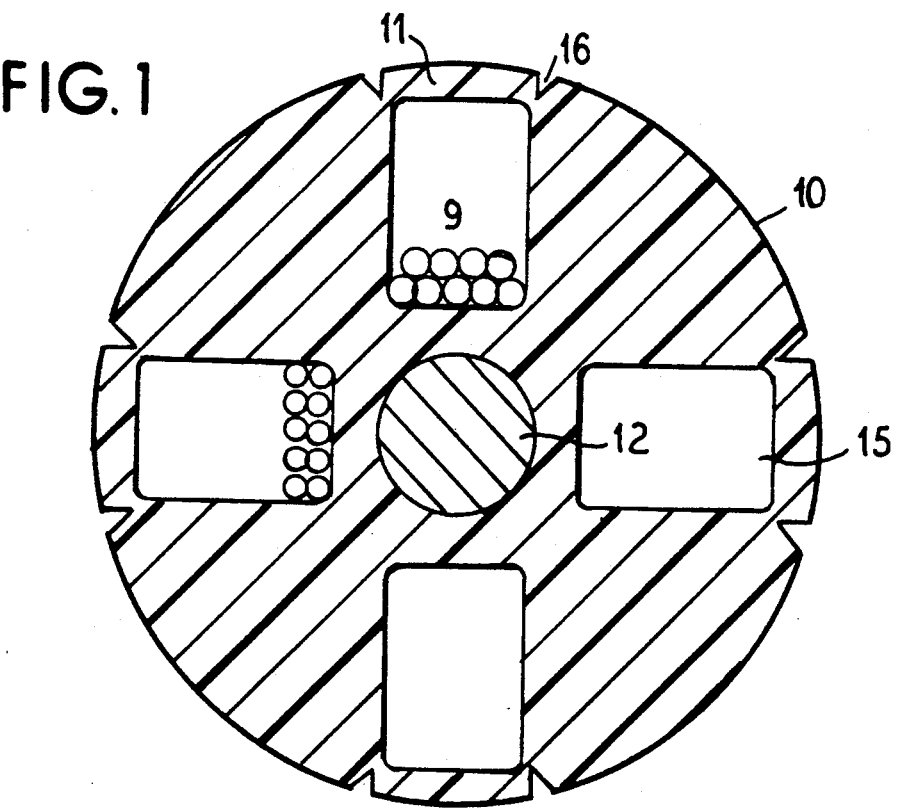
FIG.1
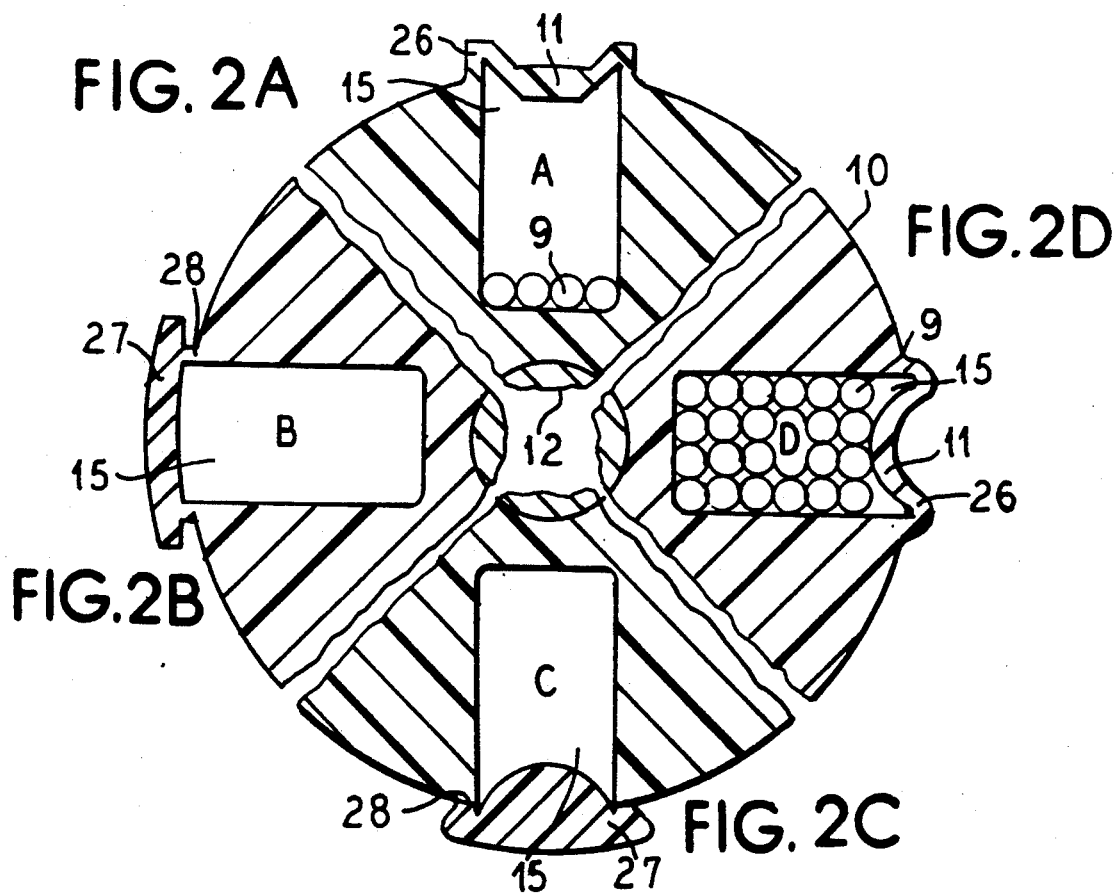
FIG.2A FIG.2D
FIG.2B FIG.2C

OPTICAL COMMUNICATIONS CABLE

BACKGROUND OF THE INVENTION

1. Field of the Invention

The invention relates to an optical communications cable with a tensile core and a plastic body (chambered body) that surrounds the core and has a number of closed chambers for accommodating one or more optical fibers, the outer boundary of the chambered body having grooves with locations of reduced wall thickness serving as rated break points or bead-like bulges forming the parts of the chamber outer walls.

2. Description of the Related Art

German Patent No. 25 23 735 discloses a communications cable in which a central core is surrounded by a plastic body that has a number of channels (chambers) for accommodating optical fibers. Tear strings for opening the chambers are provided in the wall bounding the chambers on their outwardly directed side.

EP-A1 0 169 647 discloses an optical cable in which the covers sealing the chambers are provided with a tear string. This tear string can have the form of a region with reduced wall thickness, and thus be peeled off. In this process, in all cases only a narrow subregion of the entire chamber cover is exposed, so that only a narrow slit is available for extracting optical fibers. Such a narrow slit does not facilitate the required ease of access nor, above all, the gripability of the optical fibers accommodated in the chamber interior.

EP-A1 0 169 647 exhibits depressions which serve as rated break points and are directed towards the bearing wall parts of the core, that is to say not towards the chamber opening. As a consequence, an unnecessarily large amount of material is removed during peeling of a part of the outer sheath situated between two rated break points. In this arrangement, two consecutive chambers have only one common rated break point. This arrangement presupposes that an outer layer (for example, a sheath) of material contrasting with the chambered body is provided.

SUMMARY OF THE INVENTION

It is the object of the invention substantially to improve the possibilities for simple opening of optical cables and thus for producing free access to the optical fibers situated in the chambers therein. According to the invention, in order to achieve this object in an optical communications cable of the type mentioned at the beginning the configuration is chosen such that the grooves or the bead-like bulges are arranged in each case on both sides of the chambers, and that the grooves or the bulges are directed towards the chambers and thus produce in each case a shell covering the chamber width.

The chambers thus closed facilitate particularly easy opening, since the rated break points or the beads that can be cut off are situated in each case on both sides of the chambers, and the entire chamber width can therefore be rendered easily accessible. In this process, no more of the material in the outer region of the cable is removed than is absolutely necessary. Moreover, the invention can be used both in the case of arrangements injection-molded in one part, and in the case of structures such as are designed with a plurality of layers, for example with an outer shell or outer sheath.

In embodying the invention, the bulges can be connected on both their sides via narrow webs to the compact chambered body. This renders it possible for such a cover to be peeled like the skin of a banana if it is desired to reach the interior of the chambers. This peeling possibility is further improved when the shell is produced from a harder or different, or else from a differently-colored material than the material of the central chambered body.

In order to prevent the simultaneously-inserted optical fibers from sticking to the hot chamber wall during the extrusion of the chambered body, the jacket of the optical fibers embedded in the chambers will be coated with a separator. As separator, use will preferably be made of a filler that is to prevent the longitudinal propagation of water in the chambers.

BRIEF DESCRIPTION OF THE DRAWINGS

The invention is explained in detail with reference to the following description and exemplary embodiments represented in the drawing, wherein:

FIG. 1 shows a cross section through a chambered body, and

FIGS. 2A, 2B, 2C, and 2D shown in cross section various alternate embodiments of rated break points.

DETAILED DESCRIPTION OF THE PREFERRED EMBODIMENTS

FIG. 1 shows a chambered body 10 with closed chambers 15 into which the light wave guides 9 run in the form of individual fibers, bundles or strips as early as during production of the chambered body. The chambered body is extruded about a central core 12. Provided on the sides of the chambers in the region of the outer boundary 11 of the chambered body 10 are grooves 16, which serve as rated break points and are directed towards the chambers, so that access can easily be established as needed to the optical fibers 9 situated in the chambers.

Various embodiments of a chamber so designed is shown in FIG. 2A, 2B, 2C, and 2D in which bead-like bulges 26a, 26b, 26d, and 26d are provided in the region of the outer boundary 11 of the chambered bodies 10. In the figures, four different types A-D of a chamber 15 are each provided with a cover two of which are designed in the form of a shell 27 which are connected via thin webs 28 to the body 10, and two are in the form of an outer boundary 11. In this arrangement, the shell 27 is produced from a harder or else another material than the material of the chambered body, that is to say, for example, of HDPE (high-density polyethylene) while the chambered body itself is produced from LDPE (low-density polyethylene). In such an embodiment, the interlayer can easily be torn from the chambered body as needed after incision of the thin webs, and thus expose the optical fibers.

The chamber types B+C in FIGS. 2B and 2C exhibit seals with external shells 27a and 27b, while in the case of the chamber types A+D in FIGS. 2A and 2D inwardly directed boundaries 11 are provided, the boundary also serving in the case of the chamber type D to fix the optical fibers, which are here combined in the form of a row, into strips.

In the case of the embodiments with bead-like bulges or an externally situated shell, it is also possible, of course, to separate these bulges or shells into sections as needed, so that access is afforded in sections along the cable body to the optical fibers which are situated inside.

Although other modifications and changes may be suggested by those skilled in the art, it is the intention of the inventors to embody within the patent warranted hereon all changes and modifications as reasonably and properly come within the scope of their contribution to the art.

I claim:

1. An optical communications cable, comprising: a tensile core and a chambered body of an extruded plastic that surrounds the tensile core, a number of closed chambers defined in said chambered body for accommodating one or more optical fibers therein, said chambered body including coverings over said closed chambers, said coverings being formed during extrusion of said chambered body and being of said extruded plastic, an outer boundary surface of the chambered body having grooves forming locations of reduced wall thickness serving as rated break points, the grooves being provided in each case immediately adjacent both sides of the closed chambers, and the grooves being directed towards the closed chambers and thus produce in each case a removable shell covering a width of the closed chamber.

2. An optical communications cable, comprising: a tensile core and chambered body of an extruded plastic that surrounds the tensile core, a number of closed chambers defined in said chambered body for accommodating one or more optical fibers, said chambered body including coverings over said closed chambers, said coverings being formed during extrusion of said chambered body, an outer boundary surface of the chambered body having locations serving as rated break points immediately adjacent both sides of said closed chambers, the rated break points being bead-like bulges that form parts of an outer chamber wall of aid closed chamber and so produce in each case a removable shell covering a width of the closed chamber.

3. An optical communications cable as claimed in claim 2, wherein the bead-like bulges are connected on both their sides via narrow webs to the chambered body.

4. An optical communications cable as claimed in claim 3, wherein the shell covering the width of the closed chamber is of a harder material than a material of the chambered body.

5. An optical communications cable as claimed in claim 1, wherein the optical fibers inserted in the closed chamber comprises a jacket coated with a separator.

6. An optical communications cable as claimed in claim 5, wherein said separator comprises a filler that prevents longitudinal propagation of water in the cable.

* * * * *